United States Patent
Lin

(10) Patent No.: US 7,784,731 B2
(45) Date of Patent: Aug. 31, 2010

(54) TRANSMISSION DEVICE FOR A TWIN-ROTOR HELICOPTER

(75) Inventor: Charles Lin, Preston, MS (US)

(73) Assignee: CVC Technologies, Inc., Fontana, CA (US)

( * ) Notice: Subject to any disclaimer, the term of this patent is extended or adjusted under 35 U.S.C. 154(b) by 555 days.

(21) Appl. No.: 11/846,570

(22) Filed: Aug. 29, 2007

(65) Prior Publication Data
US 2009/0057482 A1    Mar. 5, 2009

(51) Int. Cl.
- *B64D 35/04* (2006.01)
- *B64C 27/08* (2006.01)
- *F16H 48/06* (2006.01)
- *F16H 57/08* (2006.01)
- *B64D 35/06* (2006.01)

(52) U.S. Cl. ............. 244/17.23; 244/60; 475/221; 475/336; 416/129

(58) Field of Classification Search .......... 244/17.11, 244/17.19, 17.23, 60, 6, 12.2, 23 C; 475/220, 475/221, 230, 336; 416/128, 129
See application file for complete search history.

(56) References Cited

U.S. PATENT DOCUMENTS

| | | | | |
|---|---|---|---|---|
| 1,915,606 A | * | 6/1933 | Hamilton, Jr. ............. | 475/204 |
| 2,832,233 A | * | 4/1958 | Allgaier et al. ............ | 475/221 |
| 3,111,992 A | * | 11/1963 | Peterson ..................... | 416/22 |
| 3,126,966 A | * | 3/1964 | Agamian ..................... | 416/33 |
| 3,450,208 A | * | 6/1969 | Barton ........................ | 416/34 |
| 4,216,925 A | * | 8/1980 | Mendiberri ................. | 244/60 |
| 4,531,692 A | * | 7/1985 | Mateus ..................... | 244/17.19 |
| 4,913,376 A | * | 4/1990 | Black ............................ | 244/8 |
| 6,293,492 B1 | * | 9/2001 | Yanagisawa ............ | 244/17.25 |

\* cited by examiner

*Primary Examiner*—Tien Dinh
*Assistant Examiner*—Joseph W Sanderson

(57) ABSTRACT

A transmission device includes: a transmission shaft having first and second shaft sections and a gear mounting portion; a first tube sleeved rotatably on the first shaft section, and including a tube body and an annular portion; a second tube sleeved on the second shaft section; a plurality of first planetary bevel gears mounted rotatably on the gear mounting portion; a plurality of second planetary bevel gears mounted rotatably on the annular portion; a transmission gear disposed rotatably on the tube body and meshing with the first and second planetary bevel gears; a first output bevel gear disposed rotatably on the second tube and meshing with the first planetary bevel gears; and a second output bevel gear disposed rotatably on the tube body of the first tube and meshing with the second planetary bevel gears.

7 Claims, 2 Drawing Sheets

TRANSMISSION DEVICE FOR A TWIN-ROTOR HELICOPTER

BACKGROUND OF THE INVENTION

1. Field of the Invention

The invention relates to a twin-rotor helicopter, more particularly to a transmission device for a twin-rotor helicopter.

2. Description of the Related Art

A conventional twin-rotor helicopter includes an upper rotor assembly and a lower rotor assembly that rotate in opposite directions. A transmission mechanism is used to transmit power from a helicopter engine to drive rotation of the rotor assemblies in the opposite directions. However, the conventional transmission mechanism usually has a very complicated structure and is expensive to fabricate.

SUMMARY OF THE INVENTION

Therefore, the object of the present invention is to provide a transmission device for a twin-rotor helicopter that has a relatively simple structure and that is less expensive to fabricate.

Accordingly, a transmission device for a twin-rotor helicopter of the present invention comprises a transmission shaft, first and second tubes, first and second planetary bevel gears, a transmission gear, and first and second output bevel gears.

The transmission shaft defines a shaft axis, and has a first shaft section, a second shaft section that extends from the first shaft section along the shaft axis, and a gear mounting portion that is mounted on the first shaft section, that is disposed adjacent to the second shaft section, and that extends in radial outward directions from the first shaft section relative to the shaft axis.

The first tube is sleeved rotatably on the first shaft section, and includes a tube body and an annular portion that extends in radial outward directions from the tube body relative to the shaft axis.

The second tube is sleeved on the second shaft section such that the gear mounting portion is disposed between the first and second tubes.

The first planetary bevel gears are mounted rotatably on the gear mounting portion and are angularly spaced apart from each other.

The second planetary bevel gears are mounted rotatably on the annular portion and are angularly spaced apart from each other.

The transmission gear is disposed rotatably on the tube body of the first tube, is disposed between the gear mounting portion and the annular portion, and includes a first bevel gear portion that meshes with the first planetary bevel gears, and a second bevel gear portion that is opposite to the first bevel gear portion and that meshes with the second planetary bevel gears.

The first output bevel gear is disposed rotatably on the second tube adjacent to the gear mounting portion, and meshes with the first planetary bevel gears.

The second output bevel gear is disposed rotatably on the tube body of the first tube adjacent to the annular portion, and meshes with the second planetary bevel gears.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
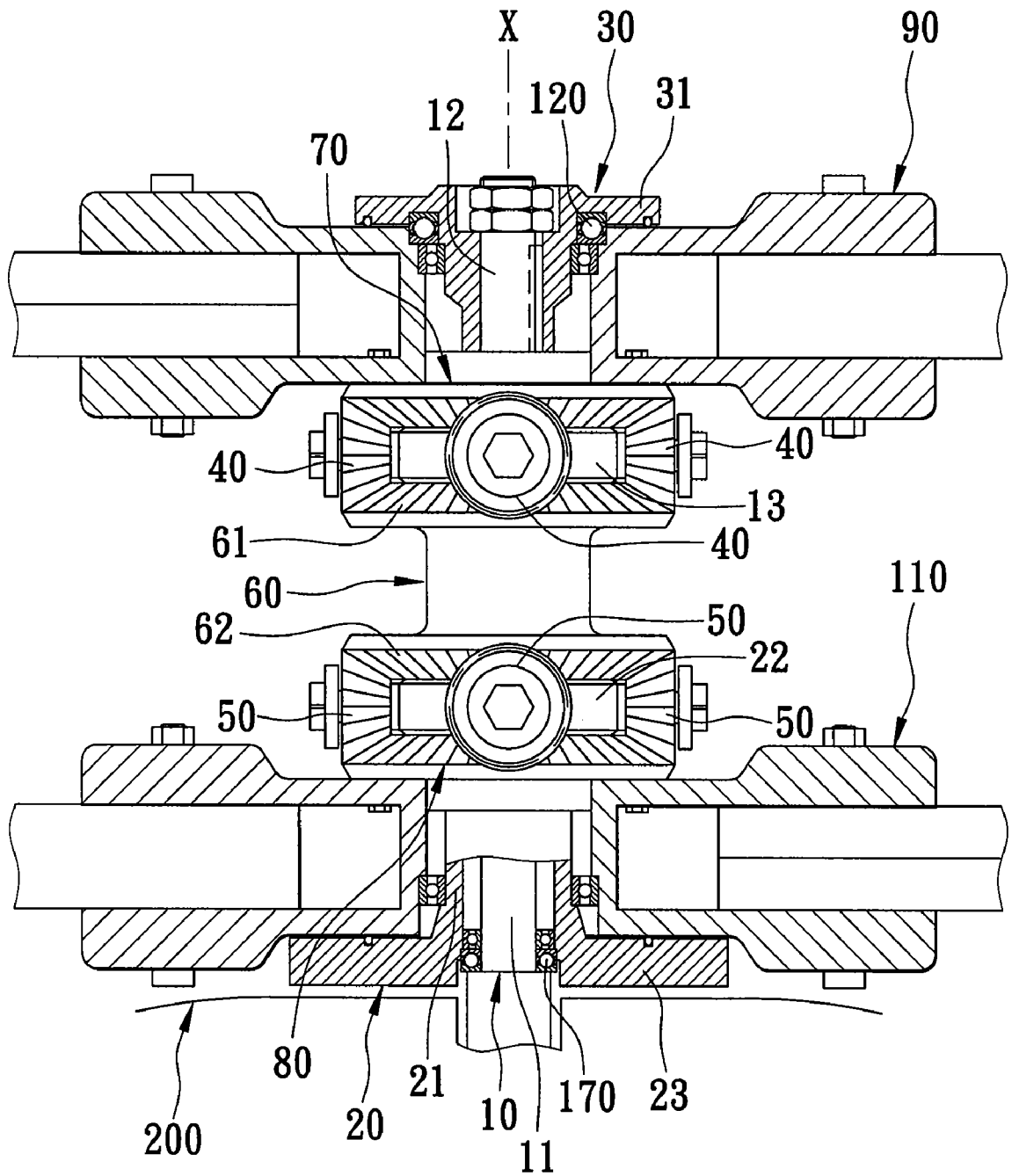
FIG. 1 is a partly sectional schematic side view of the preferred embodiment of a transmission device for a twin-rotor helicopter according to the present invention.
Figure 2:
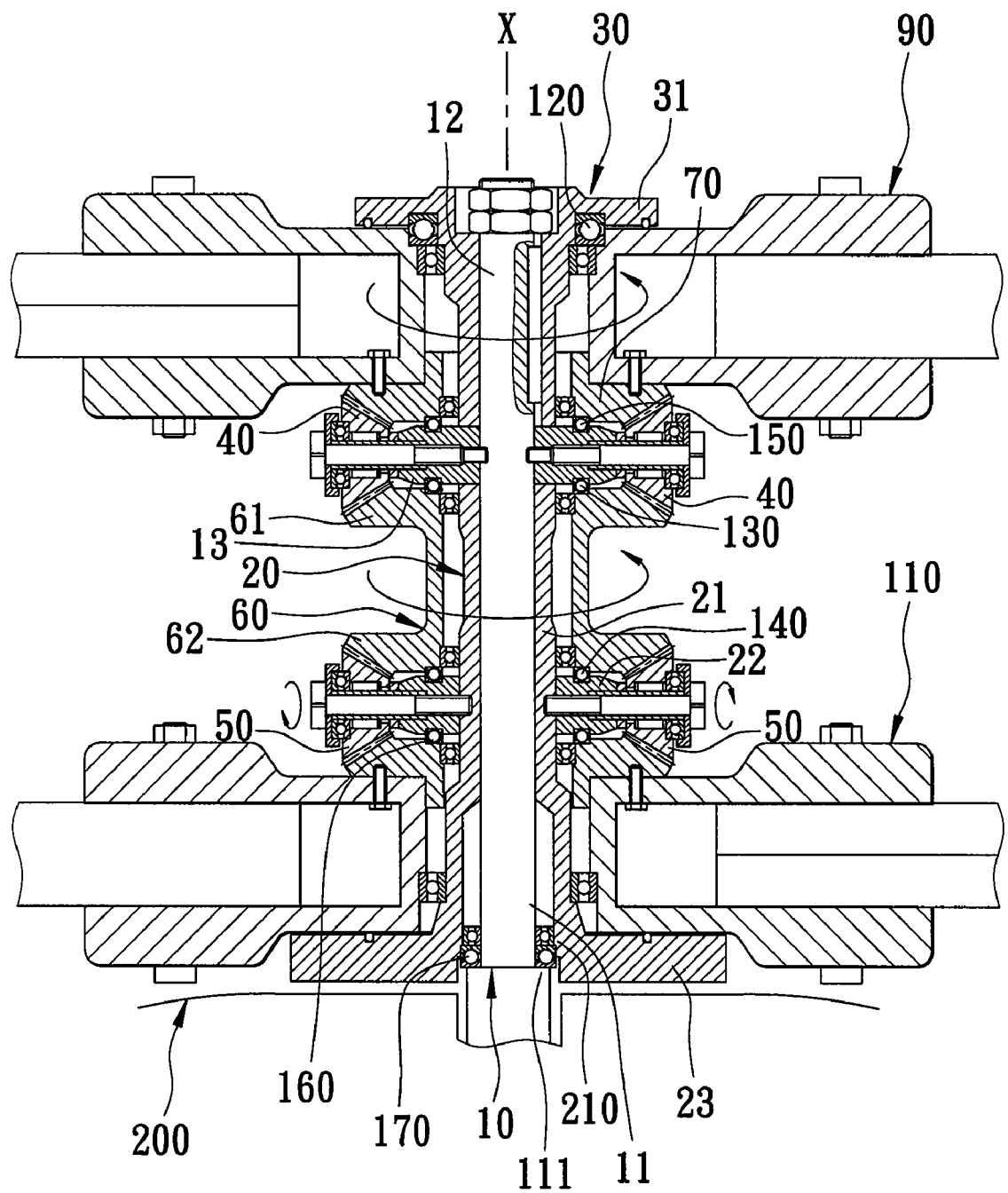
FIG. 2 is an assembled sectional view of the preferred embodiment.

Referring to FIGS. 1 and 2, the preferred embodiment of a transmission device for a twin-rotor helicopter according to the present invention is adapted to be mounted on a helicopter body 200, and is adapted to be coupled to a helicopter engine (not shown). The transmission device comprises a transmission shaft 10, a first tube 20, a second tube 30, a plurality of first planetary bevel gears 40, a plurality of second planetary bevel gears 50, a transmission gear 60, a first output bevel gear 70, a second output bevel gear 80, an upper rotor assembly 90, a lower rotor assembly 110, and six thrust bearings 120, 130, 140, 150, 160, 170.

The transmission shaft 10 defines a shaft axis (X), and is adapted to be driven by the helicopter engine to rotate about the shaft axis (X). The transmission shaft 10 has a first shaft section 11, a second shaft section 12 that extends from the first shaft section 11 along the shaft axis (X), and a gear mounting portion 13 that is mounted on the first shaft section 11, that is disposed adjacent to the second shaft section 12, and that extends in radial outward directions from the first shaft section 11 relative to the shaft axis (X).

The first tube 20 is sleeved rotatably on the first shaft section 11, and includes a tube body 21, an annular portion 22 that extends in radial outward directions from the tube body 21 relative to the shaft axis (X), and a bottom flange 23 that extends in radial outward directions from a bottom end of the tube body 21 relative to the shaft axis (X).

The second tube 30 is sleeved on the second shaft section 12 such that the gear mounting portion 13 is disposed between the first and second tubes 20, 30. The second tube 30 includes a top flange 31 that extends in radial outward directions relative to the shaft axis (X) and that is disposed opposite to the bottom flange 23.

The first planetary bevel gears 40 are mounted rotatably on the gear mounting portion 13 and are angularly spaced apart from each other.

The second planetary bevel gears 50 are mounted rotatably on the annular portion 22 and are angularly spaced apart from each other.

The transmission gear 60 is disposed rotatably on the tube body 21 of the first tube 20, is disposed between the gear mounting portion 13 and the annular portion 22, and includes a first bevel gear portion 61 that meshes with the first planetary bevel gears 40, and a second bevel gear portion 62 that is opposite to the first bevel gear portion 61 and that meshes with the second planetary bevel gears 50.

The first output bevel gear 70 is disposed rotatably on the second tube 30 adjacent to the gear mounting portion 13, and meshes with the first planetary bevel gears 40.

The second output bevel gear 80 is disposed rotatably on the tube body 21 of the first tube 20 adjacent to the annular portion 22, and meshes with the second planetary bevel gears 50.

The upper rotor assembly 90 is coupled to and is driven by the first output bevel gear 70 to rotate about the second tube 30.

The lower rotor assembly 110 is coupled to and is driven by the second output bevel gear 80 to rotate about the first tube 20.

The thrust bearing 120 is mounted between the top flange 31 of the second tube 30 and the upper rotor assembly 90.

The thrust bearing 130 is mounted between the transmission gear 60 and the gear mounting portion 13. The thrust bearing 140 is mounted between the transmission gear 60 and the annular portion 22.

The thrust bearing 150 is mounted between the first output bevel gear 70 and the gear mounting portion 13. The thrust bearing 160 is mounted between the second output bevel gear 80 and the annular portion 22.

Moreover, the first shaft section 11 has a radial outward shoulder 111, and the tube body 21 of the first tube 20 has a radial inward shoulder 210. The thrust bearing 170 is mounted between the radial outward shoulder 111 and the radial inward shoulder 210.

In operation, when the transmission shaft 10 rotates about the shaft axis (X) in a first direction (e.g., counterclockwise in FIG. 2), the transmission shaft 10 moves the first planetary bevel gears 40 therewith to result in rotation of the first bevel gear portion 61 of the transmission gear 60, the first output bevel gear 70 and the upper rotor assembly 90 about the shaft axis (X) in the first direction. On the other hand, the second bevel gear portion 62 of the transmission gear 60 drives the second planetary bevel gears 50 to result in rotation of the second output bevel gear 80 and the lower rotor assembly 110 about the shaft axis (X) in a second direction opposite to the first direction (e.g., clockwise in FIG. 2).

In view of the relatively simple structure of the transmission device of this invention, it can be fabricated at less expense.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A transmission device for a twin-rotor helicopter, comprising:
    a transmission shaft of the twin-rotor helicopter defining a shaft axis and having a first shaft section, a second shaft section that extends from said first shaft section along the shaft axis, and a gear mounting portion that is mounted on said first shaft section, that is disposed adjacent to said second shaft section, and that extends in radial outward directions from said first shaft section relative to the shaft axis;
    a first tube sleeved rotatably on said first shaft section, and including a tube body and an annular portion that extends in radial outward directions from said tube body relative to the shaft axis;
    a second tube sleeved on said second shaft section such that said gear mounting portion is disposed between said first and second tubes;
    a plurality of first planetary bevel gears mounted rotatably on said gear mounting portion and angularly spaced apart from each other;
    a plurality of second planetary bevel gears mounted rotatably on said annular portion and angularly spaced apart from each other;
    a transmission gear disposed rotatably on said tube body of said first tube and disposed between said gear mounting portion and said annular portion, said transmission gear including a first bevel gear portion that meshes with said first planetary bevel gears, and a second bevel gear portion that is opposite to said first bevel gear portion and that meshes with said second planetary bevel gears; and
    a first output bevel gear that is disposed rotatably on said second tube adjacent to said gear mounting portion and that meshes with said first planetary bevel gears; and a second output bevel gear that is disposed rotatably on said tube body of said first tube adjacent to said annular portion and that meshes with said second planetary bevel gears.

2. The transmission device as claimed in claim 1, further comprising:
    an upper rotor assembly coupled to and driven by said first output bevel gear to rotate about said second tube; and
    a lower rotor assembly coupled to and driven by said second output bevel gear to rotate about said first tube.

3. The transmission device as claimed in claim 2, wherein said first tube further includes a bottom flange that extends in radial outward directions from said tube body relative to the shaft axis, and said second tube includes a top flange that extends in radial outward directions relative to the shaft axis and that is disposed opposite to said bottom flange.

4. The transmission device as claimed in claim 3, further comprising a thrust bearing mounted between said top flange and said upper rotor assembly.

5. The transmission device as claimed in claim 1, further comprising a first thrust bearing mounted between said transmission gear and said gear mounting portion, and a second thrust bearing mounted between said transmission gear and said annular portion.

6. The transmission device as claimed in claim 5, further comprising a third thrust bearing mounted between said first output bevel gear and said gear mounting portion, and a fourth thrust bearing mounted between said second output bevel gear and said annular portion.

7. The transmission device as claimed in claim 6, wherein said first shaft section has a radial outward shoulder and said tube body of said first tube has a radial inward shoulder, said transmission device further comprising a fifth thrust bearing mounted between said radial outward shoulder and said radial inward shoulder.

* * * * *